(12) United States Patent
Tallam (10) Patent No.: US 9,246,411 B2
(45) Date of Patent: Jan. 26, 2016

(54) REGENERATIVE VOLTAGE DOUBLER RECTIFIER, VOLTAGE SAG/SWELL CORRECTION APPARATUS AND OPERATING METHODS

(71) Applicant: Rangarajan Tallam, Germantown, WI (US)

(72) Inventor: Rangarajan Tallam, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 322 days.

(21) Appl. No.: 13/652,557

(22) Filed: Oct. 16, 2012

(65) Prior Publication Data

US 2014/0104896 A1    Apr. 17, 2014

(51) Int. Cl.
| | |
|---|---|
| *H02M 7/72* | (2006.01) |
| *H02M 5/458* | (2006.01) |
| *H02M 7/217* | (2006.01) |
| *H02J 3/18* | (2006.01) |
| *H02J 9/06* | (2006.01) |
| *H02M 1/00* | (2007.01) |

(52) U.S. Cl.
CPC .............. *H02M 7/72* (2013.01); *H02M 5/4585* (2013.01); *H02M 7/217* (2013.01); *H02J 3/1814* (2013.01); *H02J 2009/063* (2013.01); *H02M 2001/0093* (2013.01); *H02M 2001/0096* (2013.01); *Y02E 40/18* (2013.01)

(58) Field of Classification Search
CPC ........... H02M 5/41; H02M 5/42; H02M 5/44; H02M 5/4505; H02M 5/451; H02M 7/72

USPC .............. 363/37, 59–61, 81, 84, 89, 125, 127
See application file for complete search history.

(56) References Cited

U.S. PATENT DOCUMENTS

| | | | | |
|---|---|---|---|---|
| 4,750,102 | A | * | 6/1988 | Yamano et al. ............... 363/142 |
| 5,515,264 | A | * | 5/1996 | Stacey .......................... 363/132 |
| 5,719,758 | A | * | 2/1998 | Nakata et al. .................. 363/98 |
| 5,896,281 | A | * | 4/1999 | Bingley ......................... 363/71 |
| 5,969,957 | A | | 10/1999 | Divan et al. |
| 6,118,676 | A | * | 9/2000 | Divan et al. ..................... 363/34 |
| 6,160,722 | A | * | 12/2000 | Thommes et al. .............. 363/37 |
| 6,750,633 | B2 | | 6/2004 | Schreiber |
| 7,158,393 | B2 | | 1/2007 | Schneider |
| 7,193,872 | B2 | * | 3/2007 | Siri ................................ 363/95 |

(Continued)

FOREIGN PATENT DOCUMENTS

| | | |
|---|---|---|
| DE | 10130339 | 1/2003 |
| DE | 102006015031 A1 | 10/2007 |
| EP | 1313206 A2 | 5/2003 |

OTHER PUBLICATIONS

Rodriguez et al., "PWM Regenerative Rectifiers: State of the Art", Fe. 2005, IEEE Transactions on Industrial Electronics, vol. 52, No. 1, pp. 5-21.*

(Continued)

*Primary Examiner* — Gary L Laxton
*Assistant Examiner* — Kyle J Moody
(74) *Attorney, Agent, or Firm* — Fay Sharpe LLP (57) ABSTRACT

Single and multiphase regenerative voltage doubler rectifiers, sag/swell corrector apparatus, and operating methods are presented in which rectifier switching devices are selectively pulse width modulated for regenerative load conditions and for regenerating power during input voltage swell circumstances.

13 Claims, 7 Drawing Sheets

(56) References Cited

U.S. PATENT DOCUMENTS

| | | | |
|---|---|---|---|
| 7,215,559 B2* | 5/2007 | Nondahl et al. | 363/37 |
| 7,274,579 B2* | 9/2007 | Ueda et al. | 363/125 |
| 7,983,060 B2 | 7/2011 | Benesch | |
| 8,089,785 B2* | 1/2012 | Rodriguez | 363/35 |
| 8,816,625 B2* | 8/2014 | Kopiness et al. | 318/430 |
| 2003/0102818 A1* | 6/2003 | Shen | 315/291 |
| 2004/0090807 A1* | 5/2004 | Youm | 363/132 |
| 2006/0285372 A1* | 12/2006 | Ozaki | 363/56.03 |
| 2007/0126384 A1* | 6/2007 | Takata et al. | 318/432 |
| 2010/0013422 A1* | 1/2010 | Ikei | 318/400.13 |
| 2010/0172162 A1* | 7/2010 | Tallam et al. | 363/37 |
| 2011/0012543 A1* | 1/2011 | Takizawa et al. | 318/139 |
| 2012/0075892 A1* | 3/2012 | Tallam et al. | 363/37 |
| 2012/0257429 A1* | 10/2012 | Dong et al. | 363/127 |
| 2013/0106328 A1* | 5/2013 | Kopiness et al. | 318/400.11 |
| 2013/0121045 A1* | 5/2013 | Murakami et al. | 363/67 |
| 2013/0235625 A1* | 9/2013 | Yamada | 363/37 |

OTHER PUBLICATIONS

J. Rodriguez, "PWM Regenerative Rectifiers: State of the Art", IEEE Transactions on Industrial Electronics, vol. 52, No. 1, Feb. 2005.

European Search Report, European Patent Applicatoin No. 13188967.7, Mailed Jan. 8, 2015; Completed Dec. 18, 2014; Munich, Germany.

* cited by examiner

REGENERATIVE VOLTAGE DOUBLER RECTIFIER, VOLTAGE SAG/SWELL CORRECTION APPARATUS AND OPERATING METHODS

BACKGROUND

Industrial equipment such as motor drives and the like operate using power from single or multiphase AC power sources. These devices, in turn, may drive regenerative loads, such as electric motors which may regenerate power back into the industrial equipment. Dynamic braking and other apparatus are sometimes provided to dissipate such regenerated power. Motor drives and other equipment may also be equipped with active front end (AFE) rectifier circuits with switches that are pulse width modulated at high frequency to perform rectification of input power to provide DC power to a bus. Some active front end rectifiers are also operable to regenerate excess power back to the power source, but such AFE rectifiers generate high frequency switching noise and thus require installation of filter circuits, such as inductance-capacitance-inductance (LCL) filters to control the harmonic content of the power grid. In addition to regeneration issues, industrial equipment is often subject to sags or swells in the AC voltage received from a power grid. Voltage sag correctors can be used to counteract the effects of input voltage sag conditions, but are unable to address voltage swells or regenerating modes.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides single and multiphase regenerative voltage doubler rectifiers and voltage sag/swell correction apparatus which may be used to facilitate selective regeneration of power back to a power source.

Regenerative rectifier apparatus is provided, which includes a voltage doubler circuit as well as a plurality of rectifier switching devices and a controller providing rectifier switching control signals. The rectifier switches are individually coupled in parallel with corresponding passive rectifier diodes of the voltage doubler circuit, and are operated by the controller in first and second modes for motoring and regenerating operation, respectively. In the first mode (motoring), the controller turns the rectifier switching devices off (nonconductive), and in the second (regenerating) mode provides switching control signals substantially at the power source fundamental frequency (e.g., fundamental front end or FFE operation) to selectively allow conduction of regenerative current from one or more DC nodes of the voltage doubler to the AC input. Unlike conventional high frequency pulse width modulated regenerative rectifiers, the rectifier apparatus of the present disclosure operates at or near the fundamental frequency and thus does not require extensive additional input filters in many applications. In addition, the disclosed regenerative rectifier apparatus advantageously turns the rectifier switching devices off during normal motoring operation, with passive rectifier components of the voltage doubler rectifying the AC input power.

Certain embodiments are adapted for connection to single-phase AC power sources, and other embodiments provide multiphase regenerative rectifier apparatus. Certain single-phase embodiments include first and second switching devices individually connected in parallel with a corresponding passive rectifier device between a first AC input node and a corresponding one of two DC nodes. First and second capacitances are connected in series with one another between the DC nodes for voltage doubling, and a center node joining the capacitors is coupled with a second AC input node. The switching devices are operative in a first state (on or conductive) and a second state (off or nonconductive), and the controller provides the switching control signals in the first mode to maintain the switching devices in these respective second states. In the second mode, the controller provides the switching control signals at the switching frequency to selectively allow conduction of current from at least one of the DC nodes to the first AC input node.

In certain embodiments, the controller provides the switching control signals in the second mode to advantageously turn the individual rectifier switches on for a pulse width time that overlaps the positive or negative peak of the AC input power (e.g., line voltage peaks and valleys) and may provide the switching control signals in non-overlapping fashion so that the first and second switching devices are not conductive at the same time. In certain multiphase embodiments, moreover, the individual rectifier switches are turned on for a pulse width time overlapping a corresponding positive or negative peak in the corresponding AC input phase, and the controller turns the switching devices on in non-overlapping fashion. This is unlike conventional three-phase fundamental front end (FFE) rectifiers which instead require overlapping conduction of two switches to provide a current flow path.

Regenerative sag/swell correction apparatus is provided, including a regenerative rectifier and an inverter. The regenerative rectifier includes a voltage doubler with AC input nodes and passive rectifier devices connected in series with one another between first and second DC nodes, as well as a pair of capacitances connected in series with one another between the DC nodes. The regenerative rectifier also includes a plurality of rectifier switching devices individually coupled in parallel across the corresponding passive rectifier device of the voltage doubler. A rectifier controller is provided which operates in a passive rectification mode to turn the rectifier switching devices off, as well as in an active regeneration mode to selectively turn the rectifier switching devices on and off at a switching frequency for selective conduction of regenerative current from one or both of the DC nodes to at least one of the AC input nodes.

The inverter includes inverter switching devices coupled in series with one another between the DC nodes and an AC output node coupled between the inverter switches. An inverter controller provides inverter switching control signals to the inverter switches to convert DC power to provide AC output power to a load coupled with the AC output node. When the load is of motoring type (consuming power), the inverter controller selectively switches the inverter switches to correct AC input voltage sag conditions and the rectifier controller operates in the passive rectification mode to turn the rectifier switches off while the inverter controller is correcting AC input voltage sag conditions. To correct AC input voltage swell conditions with a motoring type load, the rectifier controller operates in the active regeneration mode to selectively turn the rectifier switches on and off at the switching frequency to allow conduction of regenerative current from one or both of the DC nodes to at least one of the AC input nodes. When the load is of regenerating type (producing power), the rectifier operates in the passive rectification mode for voltage swell conditions and in the active regeneration mode for voltage sag conditions.

In certain embodiments, the switching frequency of the regenerative rectifier in the active regeneration mode is generally equal to the fundamental frequency of received AC input power, or a higher switching frequency may be used in other embodiments. In certain embodiments, moreover, the rectifier controller provides the rectifier switching control signals in the active regeneration to turn the individual rectifier switches on for a pulse width time that overlaps the positive or negative peak of the AC input power. Also, the rectifier controller in certain embodiments may provide the rectifier switching control signals in non-overlapping fashion so that the first and second switching devices are not conductive at the same time. In certain embodiments, the regenerative rectifier receives single-phase input power and the inverter provides single-phase output power. In some embodiments, a multiphase regenerative rectifier is provided. In certain embodiments, moreover, a multiphase inverter may provide a multiphase AC output to drive a load. In certain multiphase rectifier embodiments, moreover, the individual rectifier switches are turned on for a pulse width time overlapping a corresponding positive or negative peak in the corresponding AC input phase, and the rectifier controller turns the rectifier switches on in non-overlapping fashion. This is unlike conventional three-phase fundamental front end rectifiers which instead require overlapping conduction of two switches to provide a regenerative current flow path.

Other aspects of the disclosure relate to methods for operating a regenerative sag/swell correction apparatus having a regenerative voltage doubler rectifier and an inverter. The method includes maintaining rectifier switching devices of the voltage doubler rectifier in an off state (nonconductive), and maintaining the inverter switching devices in an off state (nonconductive) where the AC input voltage is in a normal range. For a motoring type load (one that consumes power), the method also addresses AC input voltage sags by maintaining the rectifier switches in the off state and pulse width modulating the inverter switches to drive the load while compensating for a detected voltage sag condition. If the AC input voltage is above the normal range, the method includes pulse width modulating the rectifier switches to regenerate power to the power source to compensate for a detected voltage swell condition.

In certain embodiments, the pulse width modulation of the rectifier switches is done at a switching frequency generally equal to a fundamental frequency of power received from the power source. In other embodiments, the rectifier pulse width modulation switching frequency is greater than the power source fundamental frequency. In certain embodiments, the pulse width modulation of the rectifier switching devices includes selectively turning the individual rectifier switches on for a first pulse width time overlapping a positive peak or a negative peak in the AC input voltage. In some embodiments, moreover, the rectifier pulse width modulation involves selectively turning the individual rectifier switching devices on in non-overlapping fashion so that no more than one of the rectifier switching devices is conductive at any given time.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Referring now to the figures, several embodiments or implementations are hereinafter described in conjunction with the drawings, wherein like reference numerals are used to refer to like elements throughout, and wherein the various features are not necessarily drawn to scale.

Figure 1:
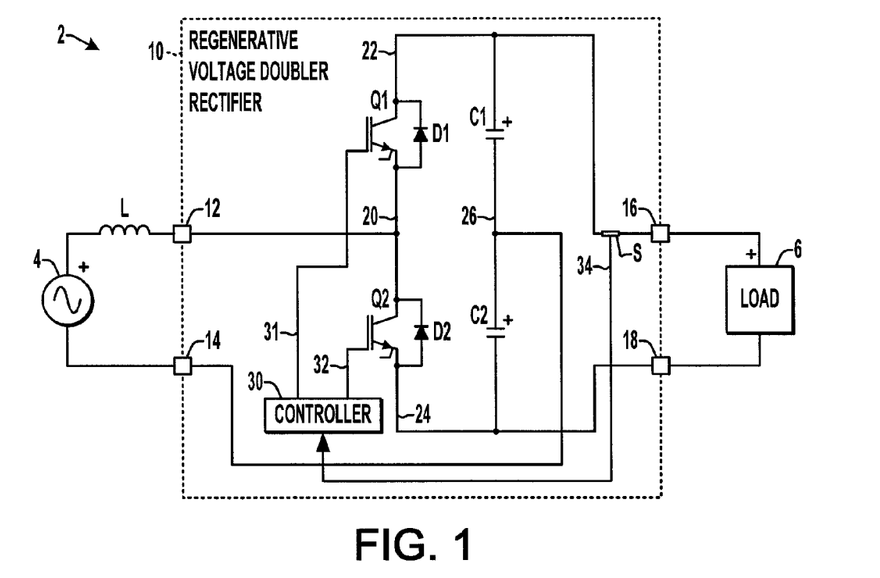
FIG. 1 is a schematic diagram illustrating a single-phase regenerative voltage doubling rectifier apparatus.
Figure 2:
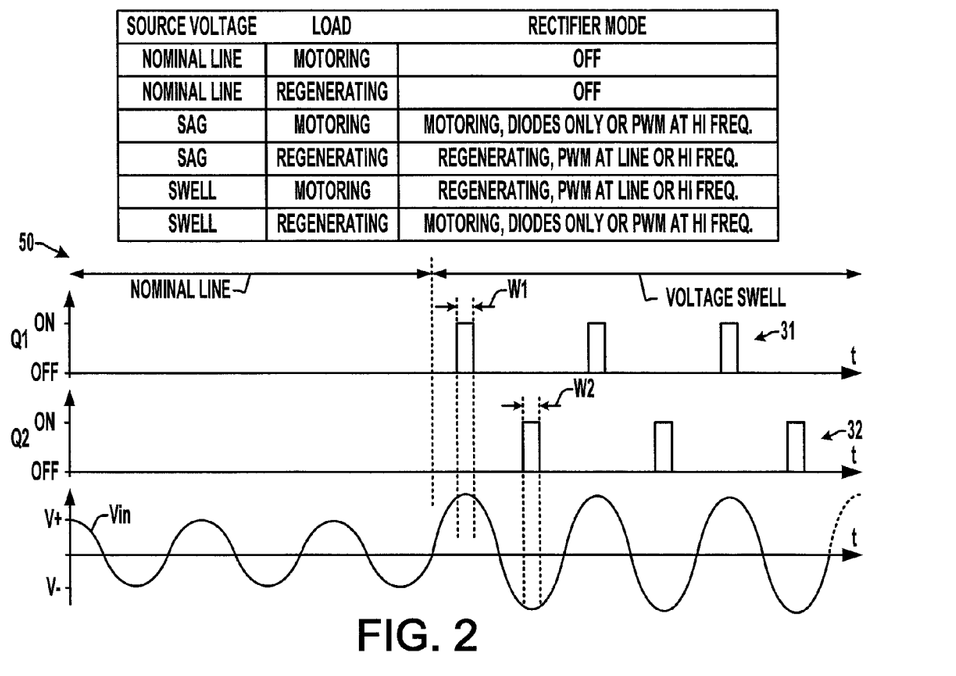
FIG. 2 is a plot showing regenerative rectifier switching control signals in the apparatus of FIG. 1 including fundamental frequency pulses aligned with the positive and negative AC input voltage peaks.

Referring initially to FIGS. 1 and 2, FIG. 1 shows a single-phase regenerative voltage doubler rectifier apparatus 10 coupled to receive input AC power from a single-phase power source 4 via AC input terminals 12 and 14. The regenerative rectifier apparatus 10 provides DC output power to a load 6, which may be any form of DC load such as an inverter as illustrated and described below. The power source 4 may be coupled with the rectifier 10 using an external inductor L, or various embodiments of the rectifier apparatus 100 may include a series inductor L connected for example between the first input terminal 12 and a first internal node 20 or between the second AC input terminal 14 and a second internal node 26. The rectifier 10 comprises a voltage doubler circuit including the input nodes 12 and 14, and passive rectifier devices D1 and D2 connected in series with one another between first and second DC nodes 22 and 24, respectively. The rectifiers D1 and D2 in certain embodiments may be rectifier diodes, and more than one diode can be connected in parallel to form each of the rectifier devices D1 and D2. The rectifiers D1 and D2 are coupled to one another at the first internal node 20, where D1 includes an anode coupled to the first AC input node 12 (and to the first internal node 20), as well as a cathode connected to the first DC node 22. The second rectifier D2 has an anode terminal coupled to the second DC node 24 and a cathode coupled to the first internal node 20 and to the first AC input node 12.

In addition, the voltage doubler circuit of FIG. 1 includes capacitances C1 and C2 connected in series with one another between the DC nodes 22 and 24, with the connection between C1 and C2 defining the second internal node 26 which is coupled to the second AC input node 14. The capacitances C1 and C2 in this example have equal capacitance values. Either or both of the capacitances C1 and C2 may be constructed using a single capacitor device or multiple capacitors connected in various series, parallel, or series/parallel configurations to provide first and second capacitances C1 and C2 connected in series between the DC nodes 22 and 24.

The regenerative rectifier 10 further includes switching devices Q1 and Q2 individually coupled in parallel across a corresponding rectifier device, with Q1 connected across D1 and Q2 connected in parallel across D2. The rectifier switches Q1 and Q2 are operable according to corresponding first and second switching control signals 31 and 32 for operation in a first state (on) to conduct current from the corresponding DC node 22 or 24 to the first AC input node 12 or in a second state (off or nonconductive) to prevent conduction of current from the corresponding DC node 22, 24 to the first AC input node 12. In certain embodiments, the rectifier switching devices are insulated gate bipolar transistors (IGBTs), although any suitable form of electrical switching device may be used. Moreover, the individual rectifier switching devices Q1 and Q2 in certain embodiments may be constructed using multiple electrical switches connected in series, parallel, and/or series/parallel configurations operable according to suitable switching control signals 31, 32 from a rectifier controller 30. The switching control signals 31 and 32 are provided by the controller 30, which may be implemented as hardware, processor-executed software, processor-executed firmware, programmable logic, etc. or combinations thereof, where the rectifier controller 30 may include suitable driver circuitry to provide control signals to operate the switching devices Q1 and Q2 in the above-mentioned first and second states.

The controller 30 is coupled with a sensor S which provides a signal or value 34 to the controller 30 indicating a DC bus voltage or current. The sensor signal or value 34 is used by the controller 30 to determine its operating mode. In particular, the controller 30 is operative in a first mode, referred to herein as a "motoring" mode to provide the switching control signals 31 and 32 to maintain the switching devices Q1 and Q2 in the second (nonconductive) state. In this first mode, therefore, the passive rectifier device D1 conducts when the voltage at the first input terminal 12 exceeds the voltage at the first DC node 22, and D2 conducts when the voltage at the second DC terminal 24 exceeds that of the first input terminal 12. With the rectifier apparatus 10 connected to the AC input source 4, the rectifier configuration of D1 and D2 charges the individual capacitors C1 and C2 each to approximately the peak voltage of the AC source 4 such that the voltage across the first and second DC terminals 22 and 24 is approximately twice the AC input voltage peak value. Thus, the voltage normally applied to the load 6 at DC output terminals 16 and 18 is approximately twice the peak AC input voltage of the power source 4 in the motoring (first) mode.

The controller 30 operates in a second mode based on the sensor signal or value 34 indicating that rectifier apparatus 10 needs to regenerate power back to the AC input source 4. In this case, the controller 30 provides the switching control signals 31 and 32 at a switching frequency generally equal to the fundamental frequency of the AC input power received from the source 4 to selectively allow conduction of regenerative current from at least one of the DC nodes 22 and 24 to the AC input node 12. Any suitable pulse width modulation switching control signals 31 and 32 may be provided by the controller 30 in order to selectively allow regenerative current conduction from the DC nodes 22 and/or 24 to the power source 4 in the second (regenerating) mode.

FIG. 2 shows a plot 50 illustrating switching control signal waveforms 31 and 32 generated by the controller 30 in certain embodiments, along with the AC input voltage waveform Vin provided by the power source 4 in FIG. 1. In the example of FIG. 2, the load is of motoring type and the controller 30 maintains the switches Q1 and Q2 in the nonconductive (off) state when the source voltage is at nominal value, and thereafter, during a voltage swell condition, pulse width modulates the switching devices Q1 and Q2 by providing periodic pulse signals 31 and 32 having respective pulse widths W1 and W2 at a switching frequency generally equal to the fundamental frequency of the AC input voltage Vin. In certain embodiments, the controller 30 changes between the motoring and regenerating mode based at least in part on one or more sensor signals or values 34 indicating a voltage and/or current condition of the DC bus, although other suitable control signals or values may be utilized in the rectifier apparatus 10 to set the operational mode of the controller 30.

As seen in FIG. 2, when the controller 30 determines (e.g., based on the sensor signal or value 34) that the rectifier needs to be in motoring mode (e.g., consuming power), the passive rectification in the rectifier apparatus 10 is provided through normal operation of the rectifier diodes D1 and D2 in the voltage doubler configuration with the series combination of C1 and C2 between the DC nodes 22 and 24 being charged to approximately twice the peak value of the input voltage from the power source 4.

When the controller 34 determines that the rectifier needs to be in regenerating mode, the signals 31 and 32 are provided as pulse width modulation control signals to allow regenerating current to flow from one or both of the DC nodes 22 and/or 24 to the first AC input node 12. In operation, the controller 30 may modulate the widths W1 and W2 of the pulse signals 31 and/or 32 in order to accommodate any suitable form of control over the magnitude of the regenerative current flow, to prevent the rise of the DC bus voltage. In accordance with the present disclosure, moreover, the pulse width modulation of the switching control signals 31 and 32 is done substantially at the fundamental frequency of the power source 4. This advantageously facilitates use of a simple input inductor L between the power source 4 in the voltage doubler circuit of the rectifier 10, whether external to the regenerative rectifier apparatus 10 or whether included within the rectifier 10. In contrast, switching the rectifier switches Q1 and Q2 at a higher switching frequency would require use of more complicated input filtering, such as LCL filters in order to mitigate harmonic distortion at the input.

In certain embodiments, moreover, the phasing of the pulse width modulation signals 31 and 32 is done by the controller 30 such that the conductive or "on" states of the switching devices Q1 and Q2 occurs during the positive or negative peak in the AC input voltage from the source 4. In the example of FIGS. 1 and 2, for instance, the upper switching device Q1 is controlled via signal 31 such that the switch Q1 is in the first (on) state for the pulse width time W1, where W1 overlaps the positive peaks in the AC input voltage Vin. This periodically allows the first switching device Q1 to conduct current from the upper (e.g., positive) DC node 22 to the first AC input node 12 at and near the input voltage peak. Similarly, the controller 30 provides the second switching control signal 32 to Q2 in the regenerating mode such that Q2 is in the first (on) state for the second pulse width time W2 which overlaps the negative peaks in the AC voltage Vin, thereby allowing Q2 to conduct current from the second DC node 24 to the first AC input node 12.

Figure 3:
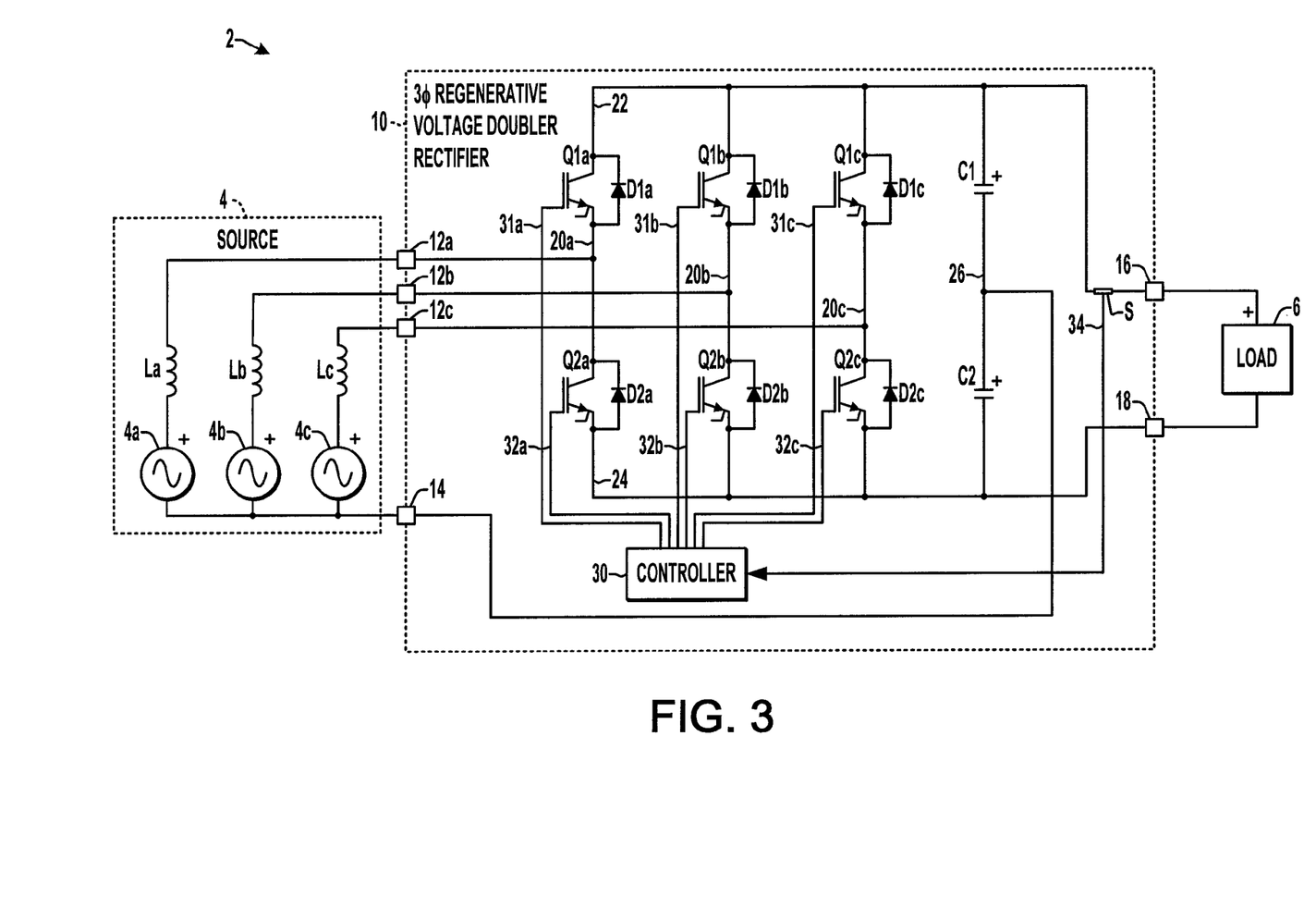
FIG. 3 is a schematic diagram illustrating a multiphase regenerative voltage doubler rectifier.
Figure 4:
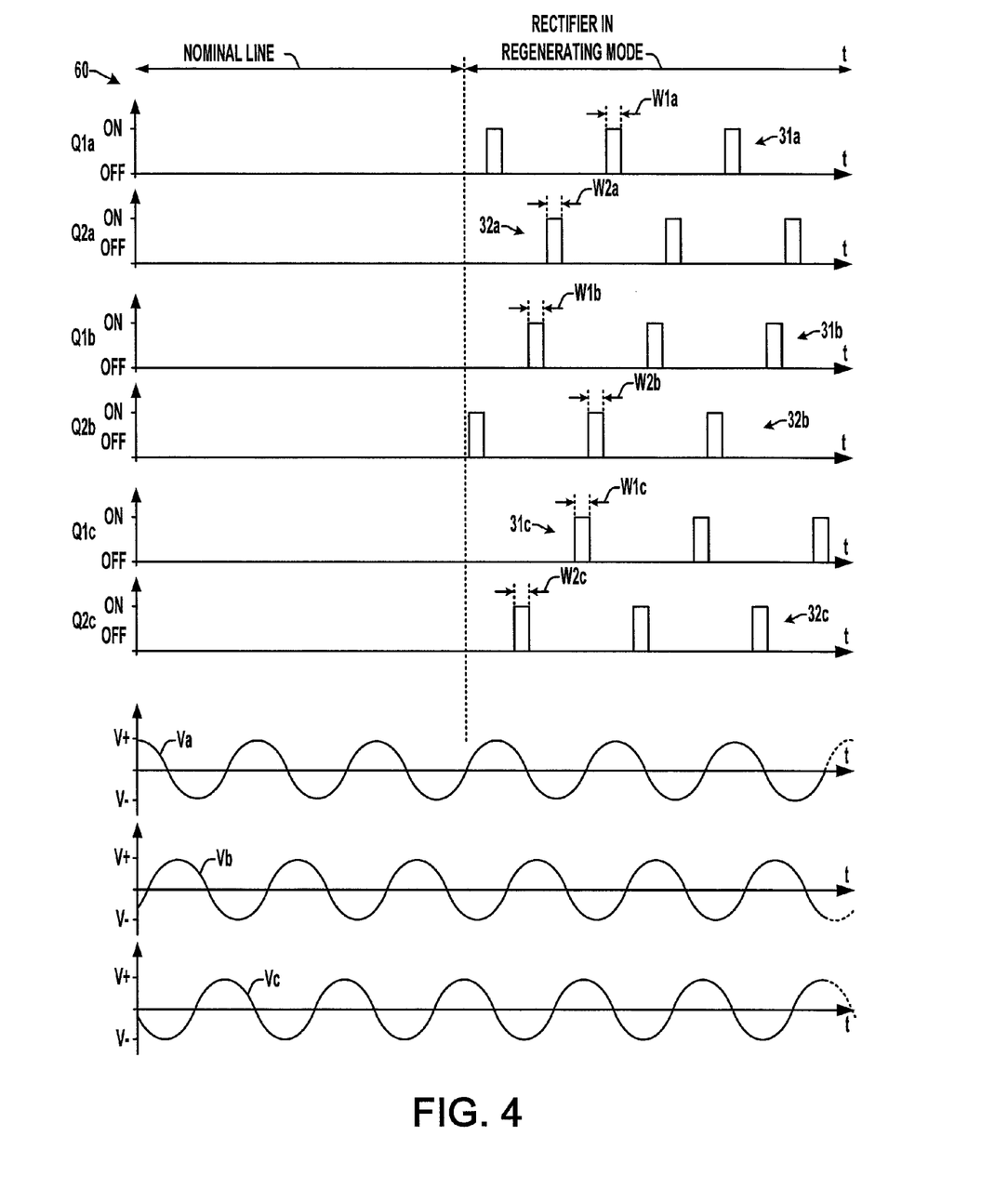
FIG. 4 is a plot showing switching control signals in the multiphase regenerative voltage doubler rectifier of FIG. 3.

Referring also to FIGS. 3 and 4, FIG. 3 illustrates a three phase regenerative voltage doubling rectifier apparatus 10 having three AC input terminals 12a, 12b and 12c for receiving corresponding phase voltage input from a three phase Y-connected source 4, as well as a neutral connection terminal 14 coupled to the neutral of the Y-connected AC source 4. As shown in FIG. 3, the power source 4 provides phase inductors La, Lb and Lc connected between the corresponding phase voltage sources 4a, 4b and 4c and the AC input nodes 12a, 12b and 12c for corresponding input phases A, B and C. Other embodiments are possible in which the phase inductors La, Lb and Lc can be provided in the regenerative rectifier apparatus 10, such as between the input nodes 12a, 12b and 12c and corresponding phase internal nodes 20a, 20b and 20c.

The rectifier apparatus 10 in this embodiment includes a corresponding pair of passive rectifier devices D1 and D2 (D1a, D2a; D1b, D2b; and D1c, D2c) connected in series between first and second DC nodes 22 and 24, respectively, with the center node of each passive rectifier pair being connected to the corresponding phase voltage input 12 (for phase A, B or C). In addition, each associated phase rectification circuit includes first and second rectifier switching devices Q1 and Q2 (Q1a, Q2a; Q1b, Q2b; and Q1c, Q2c) connected in parallel with the corresponding passive rectifier device D1 and D2, respectively. The switching devices Q1 and Q2 of each rectifier circuit, moreover, are operated by corresponding switching control signals 31 and 32 (31a, 32a; 31b, 32b; and 31c, 32c), respectively, from the controller 30. Other multiphase embodiments are possible in which like phase rectification circuits are provided for each of any number of phases for operation with a corresponding multiphase power source 4.

FIG. 4 provides a plot 60 illustrating rectifier switching control signals 31 and 32 provided by the controller 30 in one embodiment of the three-phase rectifier apparatus 10 in FIG. 3 along with the three corresponding phase voltage signals Va, Vb and Vc provided from the power source 4. The switching devices Q1a, Q2a; Q1b, Q2b; and Q1c, Q2c in the multiphase regenerative rectifier of FIG. 3 individually operate in a first state (on or conductive) to conduct current from the corresponding DC node 22 or 24 to the corresponding AC input node (12a, 12b or 12c) according to the corresponding switching control signal (31a, 32a, 31b, 32b, 31c or 32c) or in a second state (off or nonconductive) to prevent such conduction. The controller 30 provides the first and second switching control signals 31, 32 to each of the three rectifier circuits in the first mode (motoring) to maintain the corresponding first and second switching devices in the respective second states (off), and in the second mode (regenerating) at a switching frequency generally equal to the fundamental frequency of the power source 4 in order to selectively allow conduction of current from at least one of the DC nodes 22, 24 to the AC input node 12. Thus, as in the single-phase example above, the rectifier apparatus 10 facilitates controllable regeneration of power from the load 6 to the power source 4 by fundamental frequency switching of the switching devices Q1, Q2.

As seen in a plot 60 of FIG. 4, moreover, the first switching control signals 31a, 31b and 31c are provided in certain embodiments as pulse signals having a respective width W1a, W1b and W1c set by the controller 30, where the pulse times W1a, W1b and W1c overlap the positive peaks of the corresponding input phase voltages Va, Vb and Vc, respectively. Likewise, the pulse times W2a, W2b and W2c overlap the negative peaks of the corresponding input phase voltages. In addition, the controller 30 in certain embodiments provides the switching control signals 31, 32 in non-overlapping fashion such that the widths W are controlled to be less than or equal to 60° and thus at most one of the switching devices Q1, Q2 is in the on at any given time.

Figure 5A:
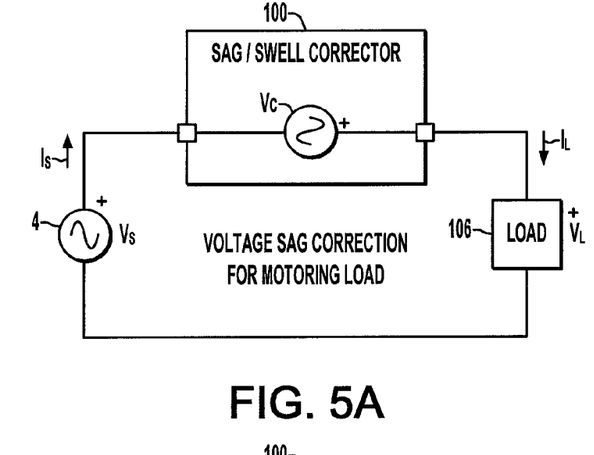
FIGS. 5A-5D are schematic diagrams illustrating four modes of operation of regenerative sag/swell correction apparatus.
Figure 5B:
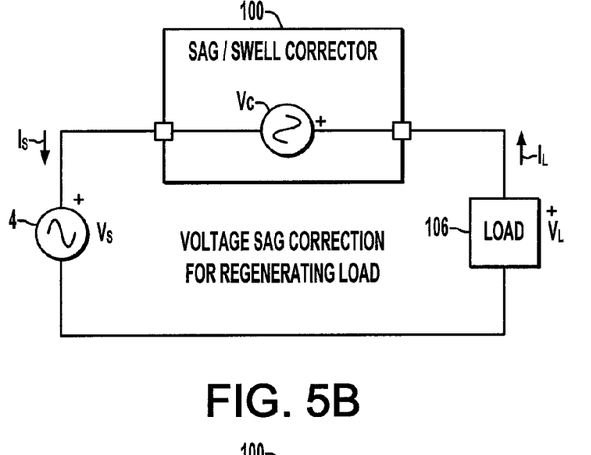
Figure 5C:
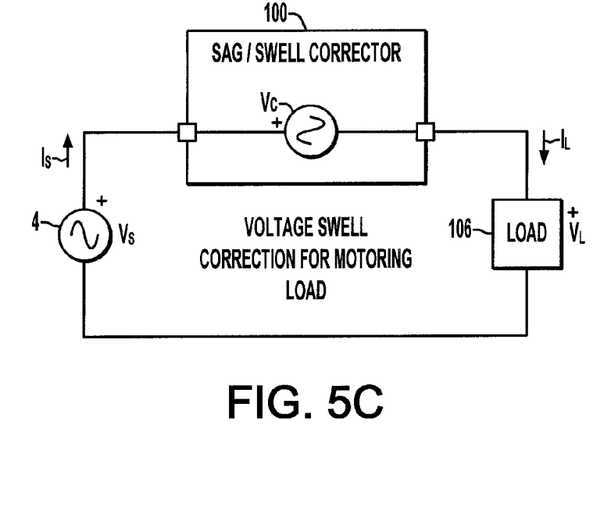
Figure 5D:
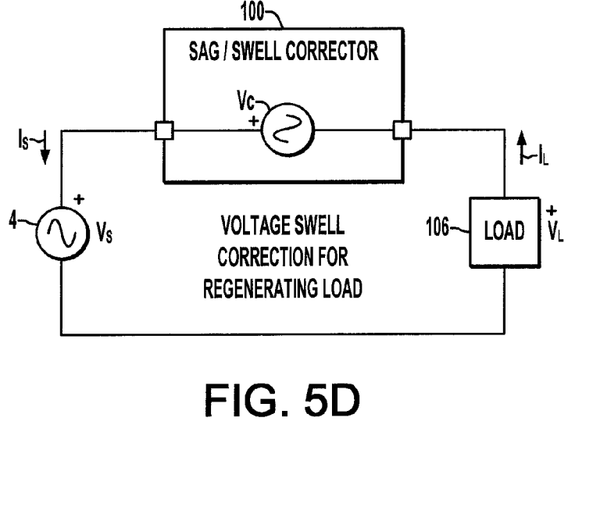

The principle of regenerative sag/swell correction is illustrated in FIGS. 5A-5D for motoring and regenerating loads, which results in four modes of operation. FIG. 5A illustrates the situation in which a voltage sag condition is corrected by a sag/swell corrector 100 due to sagging voltage levels $V_S$ provided by the voltage source 4 for a motoring load 106 (the load 106 is consuming power) having a load voltage $V_L$. In this case, source current $I_S$ flows from the source 4 to the sag/swell corrector 100, whereas load current $I_L$ flows from the sag/swell corrector 100 to the load 106. In this case, moreover, the sag/swell corrector 100 operates to counteract the sagging input voltage and thus the polarity of the corrector voltage $V_C$ is as shown in FIG. 5A. A voltage sag condition is also illustrated in FIG. 5B for the case where the load is regenerating (sourcing power). In this case, the load current $I_L$ flows from the load 106 to the corrector 100, and the source current $I_S$ flows from the corrector 100 back to the power source 4. Voltage swell conditions are shown in FIGS. 5C and 5D. FIG. 5C illustrates the situation in which the load 106 is motoring, in which case the source current $I_S$ flows from the power source 4 to the corrector 100 and the load current $I_L$ flows from the sag/swell corrector 100 to the load 106. However, unlike the situation in FIG. 5A, the corrector apparatus 100 attempts to counteract the swelling input voltage and the corrector voltage polarity $V_C$ is the opposite of that shown in FIG. 5A. FIG. 5D shows the case for a voltage swell correction for a regenerating load in which the load current $I_L$ flows out of the load 106, the source current $I_S$ flows from the corrector apparatus 100 and to the source 4, and the corrector 100, counteracts the swelling input voltage with the polarity of the corrector voltage $V_C$ is opposite to that shown in FIG. 5B.

Figure 6:
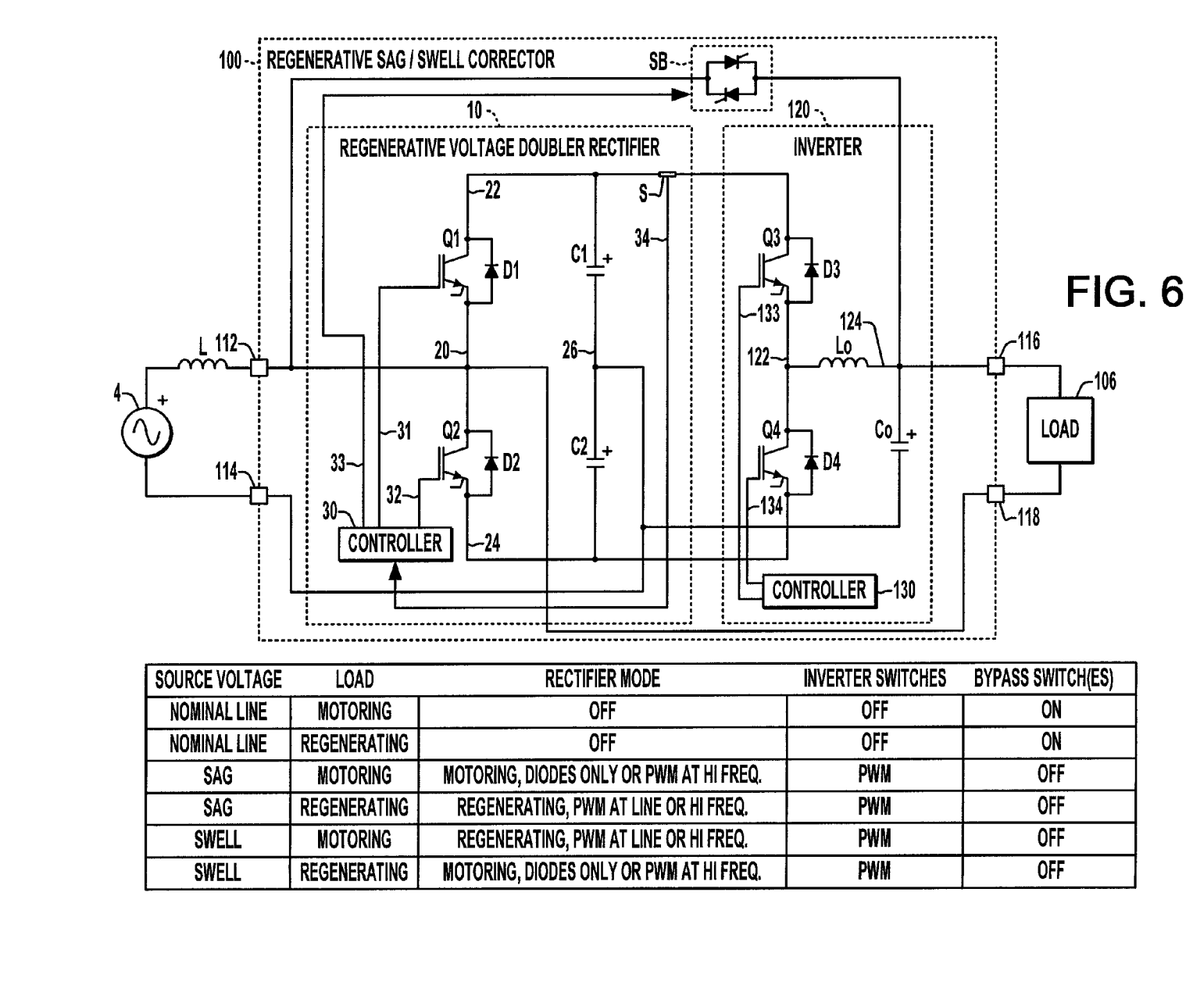
FIG. 6 is a schematic diagram illustrating a single-phase regenerative sag/swell correction apparatus with a regenerative voltage doubler rectifier and an inverter.
Figure 7:
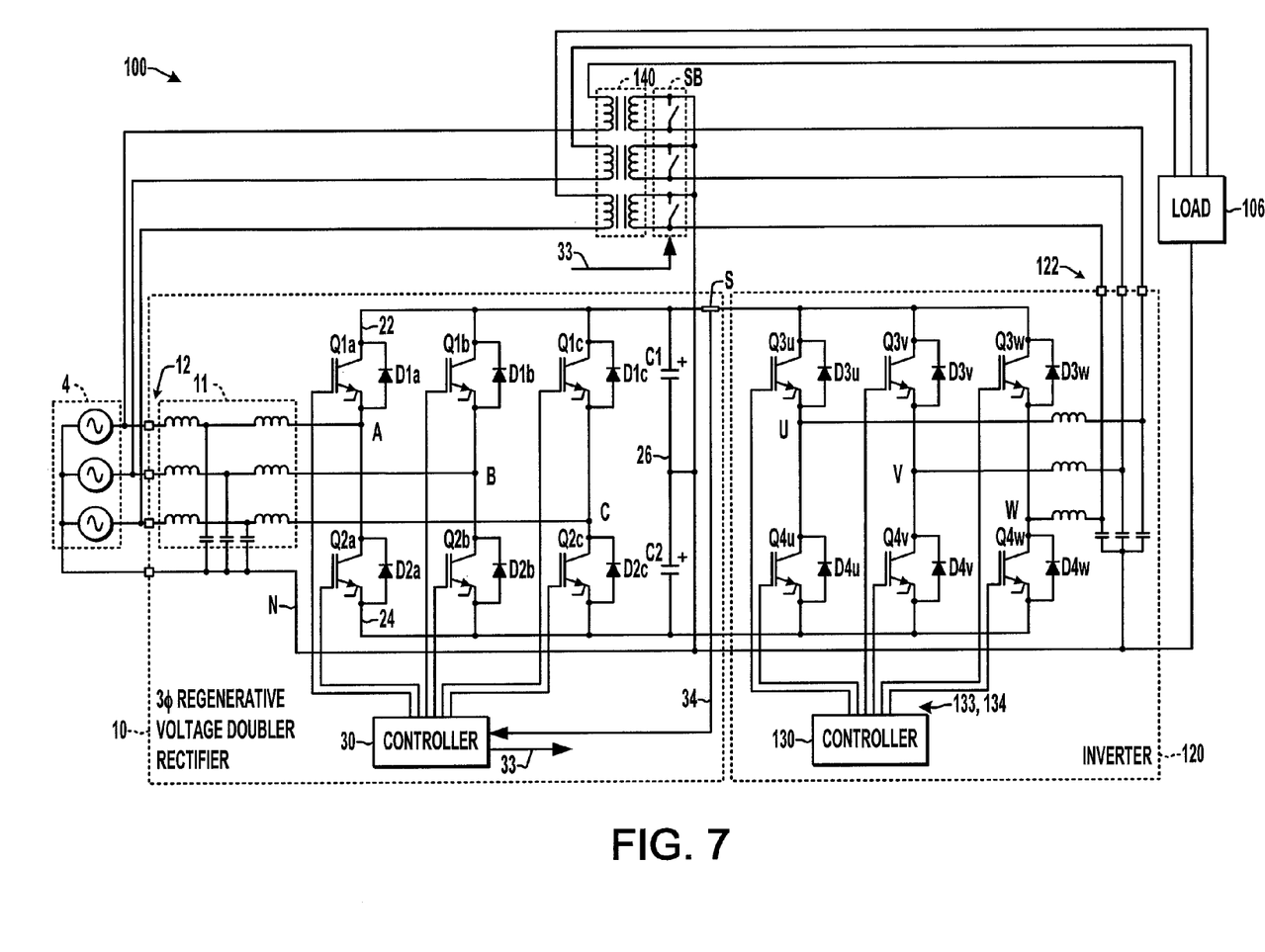
FIG. 7 is a schematic diagram illustrating a multiphase regenerative sag/swell correction apparatus with a multiphase regenerative rectifier and a multiphase inverter.

Referring now to FIGS. 6 and 7, single or multiphase regenerative sag/swell correction apparatus 100 is provided, including a regenerative voltage doubling rectifier 10 and an inverter 120, where the rectifier 10 of the sag/swell correction apparatus 100 operates in pulse width modulated control mode for the rectifier switching devices Q1 and Q2 during regenerative operation of the rectifier at either the fundamental input source frequency (FFE operation) or at a higher switching frequency for active front end (AFE) operation. A bypass switch SB is connected across the corrector apparatus 100 in FIG. 6 and is operated in one example by a signal 33 from the rectifier controller 30 or other suitable signal source to effectively bypass the sag/swell corrector during normal input voltage conditions, and the bypass switch SB is turned off (nonconductive) during sags or swells of the input voltage to allow level correction by operation of the rectifier 10 and the inverter 120. The inverter 120 operates to correct voltage sag or voltage swell conditions by pulse width modulation operation to control switching of inverter switches Q3 and Q4. During normal input voltage situations, the bypass switch SB is turned on, and the power electronics of the rectifier 10 and the inverter 120 are turned off.

FIG. 6 illustrates a single-phase example with the regenerative voltage doubler rectifier 10 having AC input nodes 112 and 114 for receiving single-phase AC power from a source 4. The rectifier 10, moreover, operates generally as described above in connection with the rectifier apparatus 10 of FIG. 1, but may be operated at the fundamental switching frequency or at a higher switching frequency for regenerating power back to the source 4.

The inverter 120 includes first and second inverter switches Q3 and Q4, which may be any suitable electrical switching device such as IGBTs in certain embodiments, which are connected in series with one another between the DC nodes 22 and 24 of the rectifier 10. In addition, the inverter 120 includes rectifier devices (e.g., diodes) D3 and D4 connected in parallel with the switches Q3 and Q4, respectively. Any suitable form of electrical switching devices Q3 and Q4 can be used in the inverter 120, including without limitation IGBTs. An inverter controller 130 provides switching control signals 133 and 134 to the inverter switches Q3 and Q4, respectively, to convert DC power from the DC nodes 22 and 24 to provide AC output power to a load 106 via an inverter output node 122 connected to a first load terminal 116 via an L-C output filter circuit including an output inductor Lo connected between the inverter output node 122 and a sag/swell corrector output node 124, as well as an output capacitor Co connected between the node 124 and the internal node 26 between the rectifier capacitors C1 and C2. A second load output terminal 118 connects the load 106 to the internal node 20 coupled between the rectifier switching devices Q1 and Q2 and connected to the first AC input terminal 112. The inverter 120 can operate according to any suitable pulse width modulation switching control scheme or algorithm for conversion of DC power from the rectifier 10 to provide AC output power to the load 106.

In normal operation with no input voltage deviations from a nominal value and with no load regeneration, the rectifier controller 30 provides a bypass switch control signal 33 to turn on (conductive) the bypass switch SB, and the switching devices Q1-Q4 of the rectifier 10 and the inverter 120 are turned off. Any suitable mechanical or semiconductor-based switch can be used for the bypass switch SB, including without limitation a mechanical switch (e.g., relay, contactor, etc.) or a pair of anti-parallel connected SCRs as shown in FIG. 6. In certain implementations, moreover, the controller 30 is provided with one or more signals or values indicating the level of the input voltage from the source 4 (not shown) and selectively turns the bypass switch SB on (conductive) when the input voltage is in a predefined normal range. Otherwise, for input voltage sag or swell conditions, the controller 30 provides the signal 33 so as to turn off the bypass switch SB (nonconductive) and the inverter 120 is activated to perform sag/swell correction operation, with the rectifier 10 switches being turned on when regeneration back to the source 4 is required.

When operative for voltage sag and/or swell conditions, the inverter 120 switches Q3 and Q4 according to suitable control signals 133 and 134 to provide AC output power to the load 106 (voltage sag operation), with the output filter Lo and Co filtering the switching output of the inverter switches Q3 and Q4 to provide generally sinusoidal output voltage to the load 106. Moreover, the rectifier controller 30 is operative during situations that require regeneration of power back to the source 4 (e.g., during voltage swell conditions) to operate the rectifier switches Q1 and Q2 through pulse width modulation at a frequency that may be substantially equal to the AC source fundamental frequency (or maybe higher) in order to provide active regeneration to selectively allow conduction of regenerative current from at least one of the DC nodes 22 and 24 to the source 4 at the input nodes 112 and 114.

When a sag or drop occurs in the AC input voltage from the source 4, the rectifier controller 30 opens the bypass switch SB, and the inverter controller 130 provides the associated switching control signals 133 and 134 to the switches Q3 and Q4 to correct for the AC input voltage sag condition, for example, by increasing the on time in the pulse width modulation scheme of the inverter controller 130. In such a voltage sag condition, moreover, if the load is of motoring type (consuming power), the rectifier controller 30 operates in a passive rectification mode to turn the rectifier switching devices Q1 and Q2 off (nonconductive), with the passive rectifier devices D1 and D2 providing passive rectification to establish the DC bus.

During input voltage swell conditions, if the load is of motoring type, with the input voltage rising above a nominal (normal) range, the rectifier controller 30 opens the bypass switch SB via signal 33 and periodically turns Q1 and Q2 on and off in order to selectively allow conduction of regenerative current from one or more of the DC nodes 22, 24 to the AC input nodes 112 and 114 to correct for the input voltage swell conditions.

During the active regeneration operation of the rectifier 10 (e.g. to address voltage swell conditions), the rectifier controller 30 selectively actuates the switches Q1, Q2 and off at a switching frequency. In certain embodiments, the active regeneration switching frequency can be generally equal to the fundamental frequency of the power source 4. In other embodiments, a higher switching frequency can be used, such as several kilohertz in one example. In this regard, the regenerative sag/swell corrector apparatus 100 may include an input filter circuit (not shown) tailored to accommodate a given pulse width modulation frequency of the regenerative rectifier 10, particularly for higher frequency regeneration operation.

This PWM operation of the rectifier switching devices Q1 and Q2 can be performed under switching control signals 31 and 32 from the controller 30 according to any suitable pulse width modulation technique. In certain embodiments, for instance, the controller 30 advantageously actuates the individual switches Q1 and Q2 at or near the corresponding positive or negative peak in the input voltage provided by the power source 4. Thus, as illustrated in FIG. 2 above, the controller 30 may implement active regeneration operation in the above-mentioned circumstances by providing a periodic pulsed switching control signal 31 at the switching frequency for a first pulse width time (W1) that overlaps the positive peak in the AC input voltage, and provides a periodic pulsed second rectifier switching control signal 32 at the switching frequency for a second pulse width time W2 overlapping the negative peaks in the AC input voltage. Moreover, the controller 30 may advantageously provide the pulsed switching control signals 31 and 32 in non-overlapping fashion such that the switching devices Q1 and Q2 are not conductive (on) at the same time.

FIG. 7 illustrates a multiphase regenerative sag/well corrector embodiment 100 having three input phases (A, B, C) and three output phases (U, V, W), where the illustrated embodiment is coupled to receive three-phase AC input power at input terminals 12 from a Y-connected source 4, although delta-connected inputs may be used. The correction apparatus 100 in FIG. 7 includes a three-phase regenerative voltage doubler rectifier stage 10 receiving the AC input power and providing a DC output to a three-phase inverter 120. The regenerative voltage doubler rectifier 10 may be constructed in similar fashion to the example of FIG. 3 above, although not a strict requirement of the disclosure and other embodiments are possible. In addition, the rectifier 10 may include an input filter circuit 11, such as a three-phase LCL circuit as shown, although other filter circuits can be used (e.g., single line inductors in each input phase, CL or LC filters, etc.) or the filter circuit 11 may be omitted in certain embodiments. As in the example of FIG. 3, a rectifier circuit is provided for each input phase having a pair of diodes (D1a, D2a; D1b, D2b; and D1c, D2c) connected in series with one another and associated parallel-connected rectifier switching devices (Q1a, Q2a; Q1b, Q2b; and Q1c, Q2c) between positive and negative DC circuit nodes 22, 24, with a center node of the diode pair D1, D2 and corresponding switches Q1, Q2 being connected to the associated input phase A, B or C. In addition, as in the above examples, the regenerative voltage doubler rectifier includes a pair of capacitances C1, C2 coupled in series with one another between the DC nodes 22 and 24, with a center node 26 of the capacitances C1 and C2 being connected to the neutral N of the power source 4.

The inverter 120 in FIG. 7 is connected to receive the DC output of the rectifier 10 along the positive and negative DC nodes 22 and 24, respectively, and provides three inverter stages, each connected between the DC nodes 22 and 24 with a center node coupled to a corresponding output phase U, V or W. Each inverter stage includes a pair of inverter switching devices Q3 and Q4 (Q3u, Q4u; Q3v, Q4v; and Q3w, Q4w) and corresponding diodes D3 and D4 (D3u, D4u; D3v, D4v; and D3w, D4w) providing regenerative current flow paths from the output phases U, V, W to the DC bus. In the illustrated embodiment, the output phases U, V and W are coupled to output terminals 122 through an output filter (e.g., three-phase L-C filter with capacitances coupled to the system neutral N), which may be of other suitable filter circuit configurations and/or which may be omitted in other embodiments. A three-phase inverter controller 130 generates inverter switching control signals for the switches Q3 and Q4, and may employ any suitable pulse width modulation technique in order to selectively couple the DC terminals 22, 24 to the associated output phase U, V or W to create AC output voltages, as applicable according to the operational mode of the regenerative sag/swell correction apparatus 100, which when added to the voltages of the AC power source 4 via a multiphase injection transformer 140, result in nearly nominal voltages at the load 106. As with the rectifier controller 30, the inverter controller 130 may be implemented as any suitable hardware, processor-executable software, processor-executable farmer, programmable logic, etc., or combinations thereof.

The sag/swell corrector apparatus 100, moreover, may cooperatively drive a load 106 in conjunction with power from the input source 4 via the output terminals 122 and any suitable auctioneering circuit. In certain embodiments, the multiphase transformer 140 may be provided as shown in FIG. 7 (e.g., injection transformer) with three secondary windings individually coupled between corresponding AC input nodes at the input terminals 12 and a corresponding phase connection to the load 106, as well as corresponding primary windings individually coupled between the corresponding one of the inverter output nodes 122 and the system neutral N. A multiphase bypass switch SB is provided in this embodiment with individual switching elements connected across each of the primary windings of the transformer 140 as shown, in order to selectively bypass the sag/swell corrector when the switching elements are closed according to a bypass switching control signal 33, for example, provided by the rectifier controller 30. In operation, for input voltage levels within a predefined normal range, the controller 30 provides the bypass switch control signal 33 so as to close the bypass switches SB and the load 106 is driven directly by the source 4, with the transformer 140 providing a very small series impedance as its primary windings are short-circuited by the bypass switches. For input voltage sags or swells, the controller 30 opens the bypass switches SB, allowing the inverter output 122 to modify the voltage levels seen by the load 106 via the transformer 140.

The injection transformer 140 may be a unitary device, or separate single-phase transformers can be provided for each phase of the power source 4 and of the load 106 in other embodiments. Likewise, a single multiphase bypass switch SB can be used, or separate switches can be provided for each of the transformer primaries. In operation, the injection transformer 140 allows the load 106 to be driven by the AC power source 4 when the bypass switches SB are closed, with the transformer providing inductances coupled in series in each of the corresponding load phases. During voltage sag conditions at the power source 4, however, the correction apparatus 100 advantageously injects additional voltage by inducing secondary voltage by driving the transformer primary windings using the inverter 120. In this manner, the apparatus 100 advantageously supplements the voltage to accommodate sagging input voltage conditions. In other embodiments, different circuitry can be used to operatively couple the AC power source 4 with the load 106 and with the inverter outputs 122, such as auctioneering diodes, etc. (not shown).

In operation, for motoring type loads, the regenerative voltage doubler rectifier 10 operates in a passive rectification mode with the rectifier switches Q1 and Q2 turned off for voltage sag conditions and for normal input voltage conditions by way of the controller 30, or operates in an active regeneration mode for voltage swell conditions similar to that of the single-phase example in FIG. 5. In particular, the rectifier controller 30 turns the switching devices Q1 and Q2 off during passive rectification operation, and during situations that require regeneration back to the source 4, provides the switching control signals 31*a*, 32*a*, 31*b*, 32*b*, 31*c* or 32*c* at a switching frequency (e.g., substantially at the fundamental input frequency in certain embodiments, or at a higher frequency in other embodiments) in order to selectively allow conduction of current from at least one of the DC nodes 22, 24 to the AC input nodes 12 for controllable regeneration of power from the DC bus across capacitances C1 and C2 to the power source 4. In certain embodiments, moreover, the three-phase regenerative voltage doubler rectifier 10 is preferably operated in the active regeneration mode as illustrated and described above in connection with FIGS. 3 and 4. In this case, the rectifier controller 30 provides periodic pulsed rectifier switching control signals 31 and 32 for the rectifier circuit associated with each input phase A, B and C, where the pulse signals are of corresponding first and second widths W1 and W2 which preferably overlap the positive and negative voltage peaks of the corresponding input phase, respectively as seen in FIG. 4. In addition, in certain embodiments, the rectifier controller 30 advantageously provides the switching control signals 31 and 32 such that these are non-overlapping, whereby the maximum width W1 and W2 in the illustrated three-phase case is 60 electrical degrees. Similar concepts can be used in constructing other multiphase embodiments (not shown).

Figure 8:
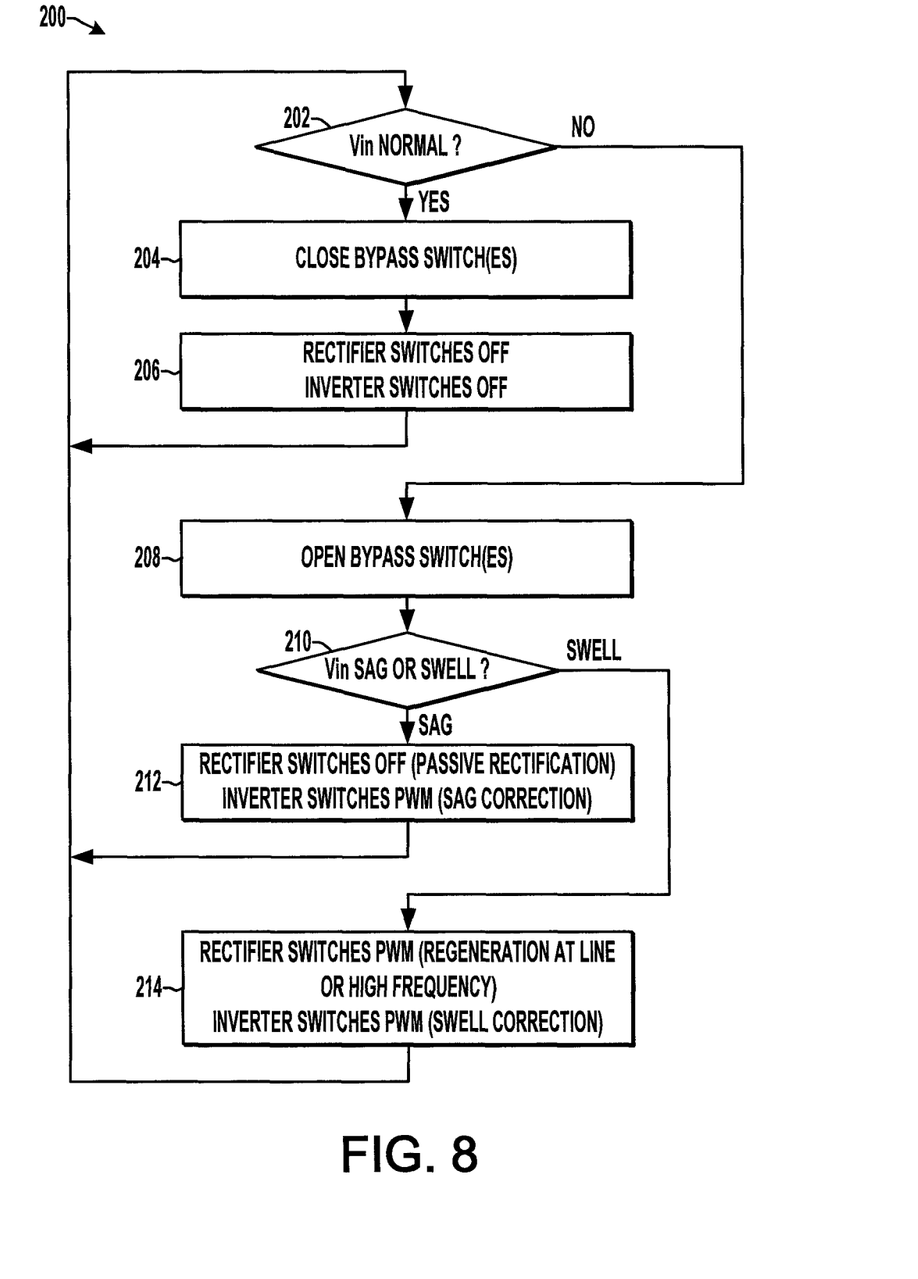
FIG. 8 is a flow diagram illustrating a sag/swell correction apparatus operating method.

FIG. 8 illustrates an exemplary method 200 for operating a regenerative sag/swell corrector (e.g., single or multiphase correction apparatus 100 above) having a regenerative voltage doubler rectifier (e.g. rectifier 10 above) and an inverter (120), for a motoring type load. While the method 200 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 200 other methods of the disclosure may be implemented in hardware, processor-executed software, or combinations thereof, such as in the exemplary rectifier controller 30 and/or inverter controller 130 described above, and may be embodied in the form of computer executable instructions stored in a tangible, nontransitory computer readable medium, such as in a memory operatively associated with the controllers 30 and/or 130 in one example. In addition, the process 200 may be employed in both single and multiphase implementations of a regenerative sag/swell correction apparatus, for instance, as in the above-described embodiments.

A determination is made at 202 in FIG. 8 as to whether the input voltage (single-phase or multiphase voltage) provided by the AC power source 4 is in a normal range. If so (YES at 202), the sag/well correction apparatus is bypassed by closing the bypass switch (e.g., switch SB above) at 204, and the rectifier and inverter switches are turned off at 206.

If the input voltage is outside the normal range (NO at 202 in FIG. 7), the bypass switch SB is opened at 208, and a determination is made at 210 as to whether a voltage sag or a voltage swell is occurring. If the input voltage is sagging (SAG at 210), the rectifier switches are turned off for passive rectification of the diodes D1, D2, and the inverter controller 130 operates the inverter 122 to pulse width modulate the inverter switches Q3, Q4 to provide supplemental output voltage such that the load 106 is driven in the desired fashion despite the sag in the input voltage as provided by the power source 4. If instead the input voltage swells (SWELL at 210 in FIG. 7), the rectifier switches Q1, Q2 are switched at the line frequency as described above or pulse width modulated at a higher frequency for active regeneration operation by the rectifier 10, while the inverter controller 130 provides the inverter switching control signals 133, 134 to pulse width modulate the switches Q3, Q4 such that the load 106 is driven in the desired fashion despite the swell in the input voltage as provided by the power source 4 in certain embodiments. In this regard, active pulse width modulation switching by the inverter controller 130 during voltage swell conditions may involve switching the devices Q3 and Q4 so as to counteract the overvoltage conditions of the input source 4 such that the load 106 is provided with the desired phase voltage levels.

In certain implementations, the regenerative voltage doubler rectifier 10 provides the pulse width modulated switching control signals 31, 32 for active regeneration at 214 in FIG. 8 at a switching frequency that is generally equal to the fundamental frequency of the input source 4 (fundamental front end operation). In other embodiments, active regeneration operation of the rectifier 10 is done by pulse width modulation at a frequency higher than the input source fundamental (AFE operation). Also, certain embodiments of the process 200 involve pulse width modulating the rectifier switching devices for active regeneration (e.g., 214) with the rectifier switches Q1, Q2 being turned on during pulse width time periods W1, W2 that overlap corresponding positive and negative peaks of the input source voltage, as shown in FIGS. 2 and 4 above. Furthermore, certain embodiments involve active regeneration by operation of the rectifier switches Q1, Q2 with the corresponding switching control signals 31, 32 being provided in non-overlapping fashion as described above. In certain embodiments, moreover, the process 200 returns in all cases (e.g., from 206, 212 and 214 in FIG. 8) to 202 and the process repeats in generally continuous fashion to address voltage sag and/or swell conditions.

The method described in FIG. 8 can be similarly extended to loads that are of the regenerating type, using the basic principles illustrated in FIG. 5.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A regenerative rectifier apparatus, comprising:

a voltage doubler circuit, including first and second AC input nodes, a plurality of passive rectifier devices connected in series with one another between first and second DC nodes, and a pair of capacitances connected in series with one another between the first and second DC nodes, the voltage doubler circuit comprising: a first rectifier diode including an anode terminal coupled to the first AC input node and a cathode terminal connected to the first DC node, a second rectifier diode including an anode terminal coupled to the second DC node and a cathode terminal coupled to the first AC input node, a first capacitance coupled between the first DC node and the second AC input node, and a second capacitance coupled between the second AC input node and the second DC node;

a plurality of switching devices individually coupled in parallel across a corresponding one of the plurality of passive rectifier devices, the plurality of switching devices comprising a first switching device coupled in parallel with the first rectifier diode, the first switching device operative according to a first switching control signal in a first state to conduct current from the first DC node to the first AC input node and in a second state to prevent conduction of current from the first DC node to the first AC input node, and a second switching device coupled in parallel with the second rectifier diode, the second switching device operative according to a second switching control signal in a first state to conduct current from the second DC node to the first AC input node and in a second state to prevent conduction of current from the second DC node to the first AC input node; and a controller operative in a first mode to provide the first and second switching control signals to maintain the first and second switching devices in the respective second states, and in a second mode to provide the first and second switching control signals at a switching frequency generally equal to a fundamental frequency of AC input power received at the first and second AC input nodes to selectively allow conduction of regenerative current from at least one of the DC nodes to at least one of the first and second AC input nodes;

the controller being operative in the second mode to provide a periodic pulsed first switching control signal at the switching frequency in the first state for a first pulse width time overlapping a positive peak in an AC voltage at the first AC input node to periodically allow the first switching device to conduct current from the first DC node to the first AC input node; and wherein the controller is operative in the second mode to provide a periodic pulsed second switching control signal at the switching frequency in the first state for a second pulse width time overlapping a negative peak in the AC voltage at the first AC input node to periodically allow the second switching device to conduct current from the second DC node to the first AC input node.

2. The regenerative rectifier apparatus of claim 1, comprising:
three or more AC input nodes individually coupleable to a corresponding phase of a multiphase AC power source; and
three or more rectifier circuits, each rectifier circuit corresponding to one of the three or more AC input nodes, wherein each individual rectifier circuit includes:
a first diode including an anode terminal coupled to a corresponding one of the three or more AC input nodes, and a cathode terminal connected to the first DC node,
a second diode including an anode terminal coupled to the second DC node, and a cathode terminal coupled to the corresponding one of the three or more AC input nodes,
a first switch coupled in parallel with the first diode, the first switch operative according to a first control signal in a first state to conduct current from the first DC node to the corresponding one of the three or more AC input nodes and in a second state to prevent conduction of current from the first DC node to the corresponding one of the three or more AC input nodes, and
a second switch coupled in parallel with the second diode, the second switch operative according to a second control signal in a first state to conduct current from the second DC node to the corresponding one of the three or more AC input nodes and in a second state to prevent conduction of current from the second DC node to the corresponding one of the three or more AC input nodes;
wherein the controller is operative to provide the first and second control signals to each of the three or more rectifier circuits in the first mode to maintain the corresponding first and second switches in the respective second states, and in the second mode at the switching frequency to selectively allow conduction of current from at least one of the DC nodes to the three or more AC input nodes.

3. The regenerative rectifier apparatus of claim 2, wherein the controller is operative in the second mode to provide the switching control signals in non-overlapping fashion so that no two of the plurality of switching devices are conductive at the same time.

4. The regenerative rectifier apparatus of claim 1, wherein the controller is operative in the second mode to provide the switching control signals in non-overlapping fashion so that no two of the plurality of switching devices are conductive at the same time.

5. A regenerative voltage sag/swell correction apparatus, comprising:
a regenerative rectifier, including:
a voltage doubler circuit, including first and second AC input nodes, a plurality of passive rectifier devices connected in series with one another between first and second DC nodes, and a pair of capacitances connected in series with one another between the first and second DC nodes, the voltage doubler circuit comprising: a first rectifier diode including an anode terminal coupled to the first AC input node and a cathode terminal connected to the first DC node, a second rectifier diode including an anode terminal coupled to the second DC node and a cathode terminal coupled to the first AC input node, a first capacitance coupled between the first DC node and the second AC input node, and a second capacitance coupled between the second AC input node and the second DC node,
a plurality of rectifier switching devices individually coupled in parallel across a corresponding one of the plurality of passive rectifier devices, the plurality of rectifier switching devices comprising: a first rectifier switching device coupled in parallel with the first rectifier diode, the first rectifier switching device operative according to a first rectifier switching control signal in a first state to conduct current from the first DC node to the first AC input node and in a second state to prevent conduction of current from the first DC node to the first AC input node, and a second rectifier switching device coupled in parallel with the second rectifier diode, the second rectifier switching device operative according to a second switching control signal in a first state to conduct current from the second DC node to the first AC input node and in a second state to prevent conduction of current from the second DC node to the first AC input node, and
a rectifier controller operative in a passive rectification mode to turn the rectifier switching devices off, and in an active regeneration mode to selectively turn the rectifier switching devices on and off at a switching frequency generally equal to a fundamental frequency of AC power received at the first and second AC input nodes; and an inverter, including:
first and second inverter switching devices coupled in series with one another between the first and second DC nodes,
an AC output node coupled between the first and second inverter switching devices, and
an inverter controller operative to provide inverter switching control signals to the first and second inverter switching devices to convert DC power to provide AC output power to a load coupled with the AC output node;
wherein the inverter controller is operative to provide the inverter switching control signals to selectively switch the first and second inverter switching devices to correct AC input voltage sag conditions, and the rectifier controller is operative in the passive rectification mode to turn the rectifier switching devices off while the inverter controller is correcting AC input voltage sag conditions;
wherein the rectifier controller is operative in the active regeneration mode to selectively turn the rectifier switching devices on and off at the switching frequency to selectively allow conduction of regenerative current from at least one of the DC nodes to at least one of the first and second AC input nodes to correct AC input voltage swell conditions;
wherein the rectifier controller is operative to provide the first and second rectifier switching control signals in the passive rectification mode to maintain the first and second rectifier switching devices in the respective second states, the rectifier controller providing the first and second rectifier switching control signals in the active regeneration mode at the switching frequency to selectively allow conduction of current from at least one of the DC nodes to the first AC input node;

wherein the rectifier controller is operative in the active regeneration mode to provide a periodic pulsed first rectifier switching signal at the switching frequency in the first state for a first pulse width time overlapping a positive peak in an AC voltage at the first AC input node to periodically allow the first rectifier switching device to conduct current from the first DC node to the first AC input node; and wherein the rectifier controller is operative in the active regeneration mode to provide a periodic pulsed second rectifier switching control signal at the switching frequency in the first state for a second pulse width time overlapping a negative peak in the AC voltage at the first AC input node to periodically allow the second rectifier switching device to conduct current from the second DC node to the first AC input node.

6. The regenerative voltage sag/swell correction apparatus of claim 5, wherein the rectifier controller is operative in the active regeneration mode to provide the first and second rectifier switching control signals in non-overlapping fashion so that the first and second rectifier switching devices are not conductive at the same time.

7. The regenerative voltage sag/swell correction apparatus of claim 5, wherein the regenerative rectifier is a multiphase regenerative rectifier including three or more AC input nodes individually coupleable to a corresponding phase of a multiphase AC power source; and wherein the inverter is a multiphase inverter including three or more AC output nodes to drive a multiphase AC load.

8. The regenerative voltage sag/swell correction apparatus of claim 7, comprising a multiphase transformer the multiphase transformer including:

three or more secondary windings individually coupled between a corresponding one of the three or more AC input nodes and the corresponding one of three or more load phase connections; and three or more primary windings individually coupled between a corresponding one of the three or more AC output nodes and a system neutral.

9. A method for operating a regenerative sag/swell corrector with a regenerative voltage doubler rectifier and an inverter, the method comprising:

if an AC input voltage received by the sag/swell corrector is in a normal range and a load driven by the sag/swell corrector is not regenerating, then maintaining rectifier switching devices of the regenerative voltage doubler rectifier in an off state and pulse width modulating inverter switching devices of the inverter to drive the load;

if the AC voltage received by the sag/swell corrector is in the normal range and the load driven by the sag/swell corrector is regenerating, then pulse width modulating the rectifier switching devices to regenerate power from the load to a power source;

if the AC voltage received by the sag/swell corrector is below the normal range, then maintaining the rectifier switching devices in the off state and pulse width modulating the inverter switching devices to drive the load while compensating for a detected voltage sag condition; and if the AC voltage received by the sag/swell corrector is above the normal range, then pulse width modulating the rectifier switching devices to regenerate power to the power source to compensate for a detected voltage swell condition and pulse width modulating the inverter switching devices to drive the load.

10. The method of claim 9, wherein pulse width modulating the rectifier switching devices is done at a switching frequency generally equal to a fundamental frequency of power received from the power source if the AC voltage received by the sag/swell corrector is in or above the normal range.

11. The method of claim 9, wherein pulse width modulating the rectifier switching devices is done at a switching frequency higher than a fundamental frequency of power received from the power source if the AC voltage received by the sag/swell corrector is in or above the normal range.

12. The method of claim 9, wherein pulse width modulating the rectifier switching devices comprises selectively turning the individual rectifier switching devices on for a first pulse width time overlapping a positive peak or a negative peak in the AC input voltage if the AC voltage received by the sag/swell corrector is in or above the normal range.

13. The method of claim 9, wherein pulse width modulating the rectifier switching devices comprises selectively turning the individual rectifier switching devices on in non-overlapping fashion so that no more than one of the rectifier switching devices is conductive at any given time if the AC voltage received by the sag/swell corrector is in or above the normal range.

* * * * *